US009697037B2

United States Patent
DeLuca et al.

(10) Patent No.: US 9,697,037 B2
(45) Date of Patent: *Jul. 4, 2017

(54) TAGGING VIRTUAL MACHINE INSTANCES BASED ON COMMANDS

(71) Applicant: INTERNATIONAL BUSINESS MACHINES CORPORATION, Armonk, NY (US)

(72) Inventors: Lisa Seacat DeLuca, Baltimore, MD (US); Dana L. Price, Surf City, NC (US); Aaron J. Quirk, Cary, NC (US); Shelbee D. Smith-Eigenbrode, Thornton, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/194,743

(22) Filed: Jun. 28, 2016

(65) Prior Publication Data

US 2017/0031701 A1    Feb. 2, 2017

Related U.S. Application Data

(63) Continuation of application No. 14/810,547, filed on Jul. 28, 2015, now Pat. No. 9,400,675.

(51) Int. Cl.
    *G06F 9/455* (2006.01)

(52) U.S. Cl.
    CPC .. *G06F 9/45558* (2013.01); *G06F 2009/4557* (2013.01)

(58) Field of Classification Search
    None
    See application file for complete search history.

(56) References Cited

U.S. PATENT DOCUMENTS

| 5,740,433 A | 4/1998 | Carr et al. |
| 8,429,639 B2 | 4/2013 | Jirka |
| 2007/0276916 A1 | 11/2007 | McLoughlin et al. |
| 2008/0134175 A1 | 6/2008 | Fitzgerald et al. |
| 2012/0129572 A1 | 5/2012 | Johnstone et al. |
| 2015/0058834 A1 | 2/2015 | Chan |
| 2015/0101042 A1 | 4/2015 | Yang |

OTHER PUBLICATIONS

Docker, "Dockerfile Reference," Docker Docs, 24 Pages, Docker Inc., https://docs.docker.com/reference/builder/, Accessed on Jul. 24, 2015.
Emruli et al., "Spring Cloud AWS," Spring Cloud Umbrella Project, Last Modified on Mar. 31, 2015, p. 1-56, http://cloud.spring.io/spring-cloud-aws/spring-cloud-aws.html#_using_instance_tags, Accessed on Mar. 31, 2015.

(Continued)

*Primary Examiner* — Gregory A Kessler
(74) *Attorney, Agent, or Firm* — Robert J. Shatto

(57) ABSTRACT

Aspects of the present disclosure are directed towards a method of receiving a first command for a virtual machine (VM) instance. This includes performing automatic command line parsing on the first command. This can further include associating, based on automatic command line parsing, a first tag with the VM instance. This can further include causing the first tag to be displayed as associated with the VM instance.

19 Claims, 8 Drawing Sheets

(56) References Cited

OTHER PUBLICATIONS

Etemad et al., "Transparent, Distributed, and Replicated Dynamic Provable Data Possession," Proceedings of the 11th International Conference on Applied Cryptography and Network Security, Apr. 15, 2013, p. 1-22, Springer-Verlag Berlin Heidelberg.

Halperin, "An Introduction to the UNIX make Utility," Tel Aviv University School of Computer Science Software 1 Course, p. 1-7, http://www.math.tau.ac.il/~danha/courses/software1/make-intro.html, Accessed on Mar. 12, 2015.

Li et al., "An Application Framework for Efficient, Reliable and Secure Access to Memory Spot," HP invent, Apr. 18, 2007, p. 1-24, HPL-2006-83(R.1), HP Laboratories Digital Printing and Imaging Laboratory, Hewlett-Packard Development Company, L.P.

Mell et al., "The NIST Definition of Cloud Computing," National Institute of Standards and Technology, Sep. 2011, p. 1-3, Special Publication 800-145.

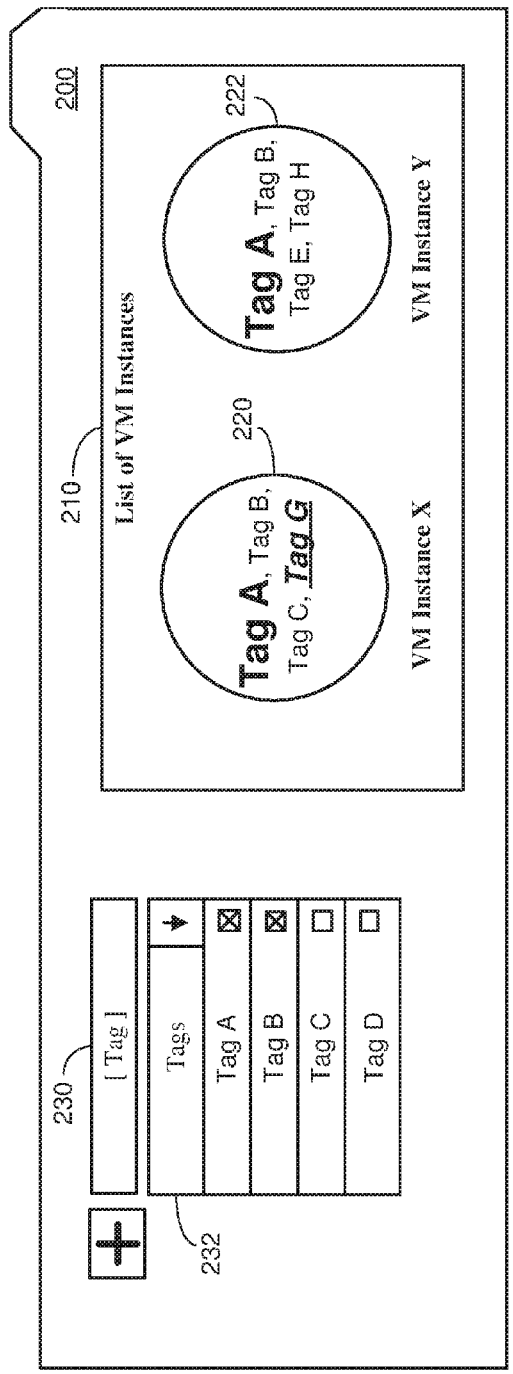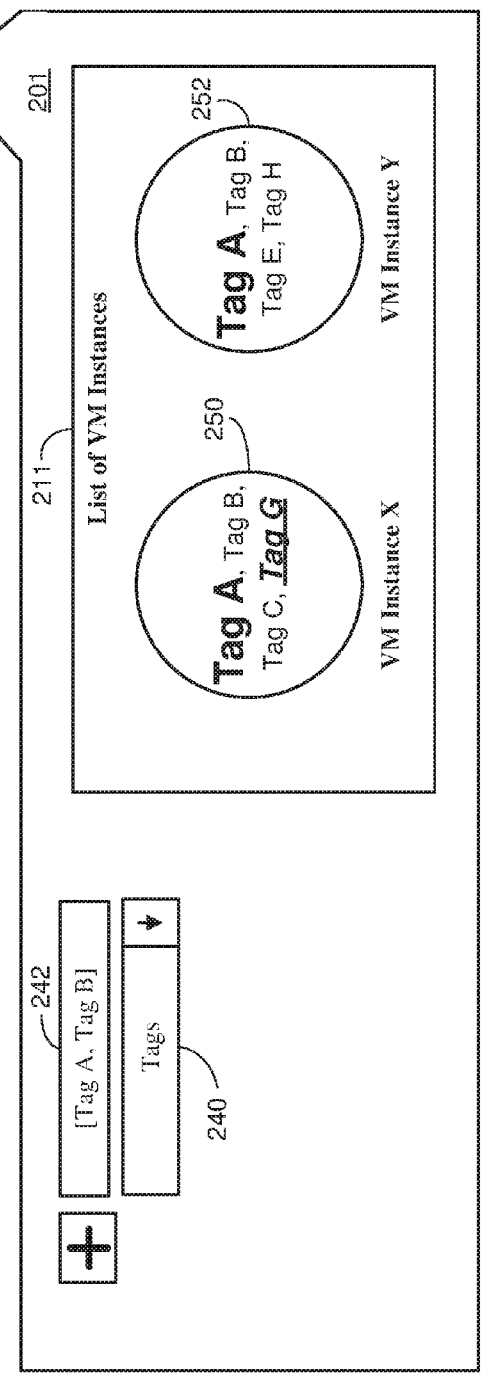
FIG. 2A
FIG. 2B

TAGGING VIRTUAL MACHINE INSTANCES BASED ON COMMANDS

BACKGROUND

The present disclosure relates to data processing, and more specifically, to software development, installation, and management.

A tag is a non-hierarchical keyword or term assigned to an item (such as an application, software, file, or computer program). A tag can be a type of metadata that helps describe an item and can allow it to be found again by browsing or searching. Tags are generally chosen informally and personally by the item's creator or by its viewer, depending on the system. Tagging can be applied to virtual machine (VM) instances and resources within a distributed computing environment.

SUMMARY

According to embodiments of the present disclosure are directed towards a method of tagging virtual machine instances based on commands. In embodiments, the method can include receiving a first command for a virtual machine (VM) instance. In embodiments, the method can include performing automatic command line parsing on the first command. In embodiments, the method can include associating, based on the automatic command line parsing, a first tag with the VM instance. In embodiments, the method can include causing the first tag to be displayed as associated with the VM instance.

Aspects of the present disclosure are directed towards a system for tagging virtual machine instances based on commands. In embodiments, the system can include a processor and a computer readable storage medium having program instructions embodied therewith. In embodiments the program instructions can be executable by the processor to cause the system to receive a first command to perform a modification to a virtual machine (VM) instance. In embodiments, the system can performing automatic command line parsing on the first command. In embodiments, the system can associate, based on the automatic command line parsing, a first tag with the VM instance. In embodiments, the system can further cause the first tag to be displayed as associated with the VM instance.

Aspects of the present disclosure are directed towards a computer program product for tagging a virtual machine instances based on commands. The computer program product comprising a computer readable storage medium having program instructions embodied therewith, the computer readable storage medium is not a transitory signal per se, the program instructions executable by a computer to perform a method. In embodiments, the method can include tagging virtual machine instances based on commands. In embodiments, the method can include receiving a first command for a virtual machine (VM) instance. In embodiments, the method can include performing automatic command line parsing on the first command. In embodiments, the method can include associating, based on the automatic command line parsing, a first tag with the VM instance. In embodiments, the method can include causing the first tag to be displayed as associated with the VM instance.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 2A and FIG. 2B depict a list of VM instances according to their association with a tag A and a tag B within an interactive user interface, according to various embodiments.

Figure 1:
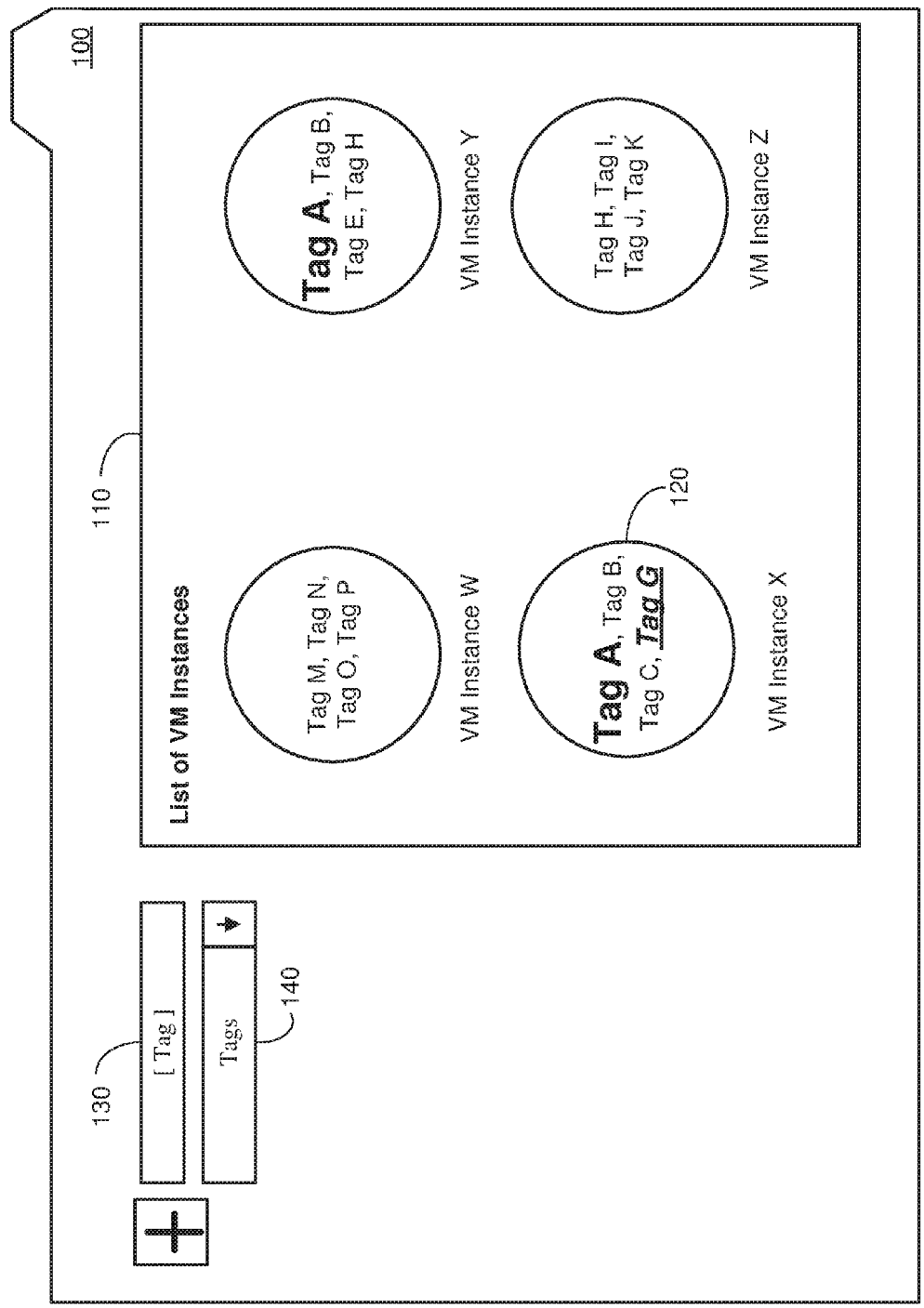
FIG. 1 depicts a list of virtual machine (VM) instances within an interactive user interface, according to various embodiments.

While the embodiments of the disclosure are amenable to various modifications and alternative forms, specifics thereof have been shown by way of example in the drawings and will be described in detail. It should be understood, however, that the intention is not to limit the embodiments of the disclosure to the particular embodiments described. On the contrary, the intention is to cover all modifications, equivalents, and alternatives falling within the spirit and scope of the embodiments of the disclosure.

DETAILED DESCRIPTION

Aspects of the present disclosure relate to data processing; more particular aspects relate to software development, installation, and management. While the present disclosure is not necessarily limited to such applications, various aspects of the disclosure may be appreciated through a discussion of various examples using this context.

Often times when a developer loads a virtual machine (VM) instance of an image within a remote computing environment, he can make modifications to the instance that are specific to that instance. Currently, there is no way for the developer or his organization to identify which commands were run against that instance or which applications were installed on the instance without opening the instance and inspecting it, or at least not without manually tagging the command or the application to the instance. Manually tagging or adding a description to an instance can be time consuming and the developer can forget to manually tag the command or the application to the instance. A lack of dynamic tagging or intelligently describing the instance based on commands or application updates can lead to image-sprawl, i.e., many duplicated base images across a datacenter, and is wasteful of valuable resources, particularly storage. In today's cloud economy, storage is a highly sought after resource and reduction in storage footprint is direct savings to the consumer. Additionally, the developer's time may be wasted when he is recreating something that already exists and can be reused or when he is manually tagging the command or application to the instance.

To assist developers and organizations with reusing virtual machine (VM) instances, commands to modify an attribute, e.g. install, update, or delete software, within a VM instance within a network, e.g. a remote computing environment, can be automatically parsed. The attributes can then be tagged as associated with the VM instance so that developers and organizations utilizing the VM instance can identify attributes of the VM instance. Attributes of the VM instance can include software, applications, and computer programs installed within the VM instance. The attributes can also include security settings of the VM instance. The tagging can also include removing and updating attributes within the VM instance for identifying attributes of the VM instance that are currently installed. Reusing VM instances can reduce wasting resources, e.g., memory, processing power, within the computing environment.

A tag can be a visual representation identifying that a particular attribute is installed on a VM instance. The tag can be associated with a VM instance based on parsing a received command. The associated tag can be displayed within a user interface (UI). The UI can display one or more tags that are associated with the VM instance. This visual representation via the UI can help a user clearly identify attributes installed in the VM instance. The UI can also be interactive so as to allow the user to adjust the detail and appearance of the tags to fit their preference. Adjusting the detail and appearance of the tags can include changing the font, thickness, color, shape, and size of the tag. The tags can be automatically adjusted according to how much the user uses the attributes corresponding to the tags. Differentiating tags that are often used by user from tags that are used less often can increase the likelihood of the user being able to clearly identify attributes that could otherwise be unintentionally reinstalled within the VM instance. For example, a tag associated with a particular attribute, e.g. a PDF viewer, that is used multiple times a day can be displayed ten times larger than the tag associated with a different attribute that is rarely used.

Turning now to FIG. 1, a UI 100 displaying multiple instances and their associated tags can be seen, according to various embodiments. In embodiments, the list of VM instances 110 can display VM instances that are installed in the computing environment, e.g., VM instance W, VM instance X, VM instance Y, and VM instance Z. For example, the UI 100 lists the tags that are associated with VM instance X within the circular display 120. VM instance X includes tag A, tag B, tag C, and tag G. In embodiments, the boldness of tag A can indicate the installed application associated with tag A is used more often than other tags within VM instance X. The size of tag A relative to other tags within VM instance X can also indicate that tag A is used more often than other tags within VM instance X. The boldness of tag G can indicate that tag G is used often compared to tag B or tag C. Tag G being italicized can indicate that tag G is an attribute that the developer has attempted to install many times. Tag G being italicized can also indicate that tag G is an attribute that the developer has updated many times. Tag G being underlined can indicate the amount of computing resources used by the attribute. For example, an underlined tag can indicate an attribute requiring more processing power compared to other attributes within the VM instance, such as a media player. Although the tags associated with the VM instances are organized within a circular display 120, the display can layout the tags in various shapes and listings. For example, the tags can be displayed in a chart, and the tags can also be displayed as a list.

In embodiments, the developer or his organization can also use interactive search features 130, 140 within the UI to display only those VM instances that include the searched for tags. For example, by searching for a particular tag within a UI displaying one hundred VM instances, the search feature can remove the VM instances from the display that do not have an association with the particular searched tag. In embodiments, the UI can include a keyword search feature 130 where a user can enter tags in order to search for VM instances that are associated with the entered tags, e.g., by removing VM instances from the display within the UI that are not associated with the entered tags. In embodiments, the UI 100 includes a drop down search menu 140 that can display a list of tags that are associated with VM instances that are installed within the computing environment. The developer or his organization can select the tags from the drop down search menu 140 in order to find a desired VM instance.

Turning now to FIG. 2A, an interactive user interface (UI) 200 displaying a list of VM instances 210 according to their associations with a tag A and a tag B can be seen, according to various embodiments. A drop down search menu 232 can be being utilized (rather than a keyword search feature 230) to search the list of VM instances 210 according to their associations with tag A and tag B. Though only tag A, tag B, tag C, and tag D are shown as options in the drop down search menu 232, the drop down search menu 232 can display every tag that has an association with a VM instance in the list of VM instances. In the depicted example, tag A and tag B were selected from the drop down search menu 232. VM instance X 220 and VM instance Y 222 are displayed in the list of VM instances because of their associations with tag A and tag B. VM instance W and VM instance Z were removed from the list of VM instances 210 because they are not associated with tag A and tag B.

Turning now to FIG. 2B, an interactive user interface 201 displaying a list of VM instances 211 according to their association with a tag A and a tag B can be seen, according to various embodiments. In embodiments, a keyword search feature 242 is being utilized to search the list of VM instances 211 according to their associations with tag A and tag B rather that utilizing the drop down menu 240. In embodiments, tag A and tag B were entered into the keyword search feature 242 and their associated VM instances, VM instance X 250 and VM instance Y 252, are displayed within the list of VM instances 211 because of their associations with tag A and tag B. VM instance W and VM instance Z were removed from the list of VM instances 211 because they are not associated with tag A and tag B. VM instance X 250 or VM instance Y 252 can be selected by a user to view the tags associated with either VM instance X or VM instance Y.

Figure 3:
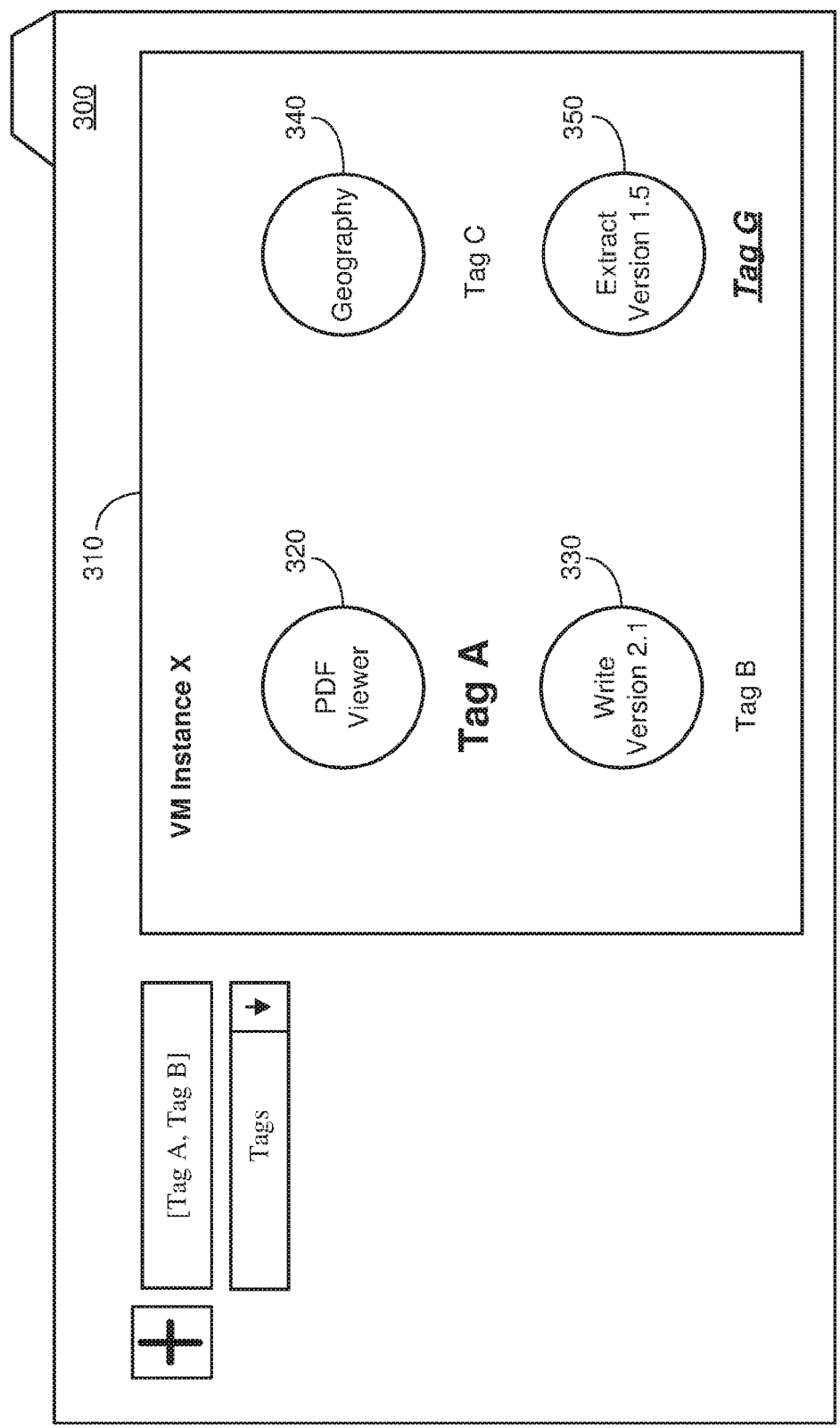
FIG. 3 depicts a VM instance and one or more tags that are associated with the VM instance, according to various embodiments.

Now turning to FIG. 3, VM instance X as selected from the list of VM instances 210 in FIG. 2A and one or more tags that are associated with VM instance X can be seen in a UI 300, according to various embodiments. In embodiments, tag A 320, tag B 330, tag C 340, and tag G 350 can be seen within the list of tags 310 based on their associations to VM instance X. Each tag can include a brief description of its contents. For example, as depicted, tag A 320 includes the brief description 'PDF Viewer' that can indicate tag A is associated with an attribute for viewing PDF documents. Likewise, tag B 330 includes the brief description 'Write Version 2.1' that can indicate that tag B is associated with an attribute for a writing application. 'Write Version 2.1' can also indicate the version of the attribute. For example, the attribute described by tag B 330 could have been upgraded and the brief description could have been changed to note the upgrade. For example, a previous tag for 'Write Version 2.1' could have been 'Write Version 2.0'. Likewise, in embodiments, tag C 340 includes the brief description 'Geography' that can indicate tag C is associated with an attribute for viewing a geographic location, or for getting directions to a geographic location. The tag C 340 can also be changed according to an upgrade of an attribute. For example, tag C can have a brief description of 'Geography 2.0' if the associated attribute is upgraded to a version 2.0. Likewise, in embodiments, tag G 350 includes the brief description 'Extract Version 1.5' that can indicate tag G is associated with an attribute for extracting portions of a PDF file. Tags within the UI 300 can be adjusted according to APs and MPs within received commands. For example, tags can be removed from the UI. For example, if a command to uninstall an attribute is received, an associated existing tag of the attribute can be removed from the UI.

In embodiments, the appearance of the tags can be customized according to a user's preference. For example, the customizable features can include changing the color of the tag, changing the font of the brief description, and changing the wording of the brief description. Customizing the appearance can be accomplished in various ways, e.g., by selecting a particular tag and then changing its font. Customizing the appearance of the tag can also be accomplished by setting a default appearance for one or more tags so that when a tag is first displayed within the UI 100, the tag can be displayed per a default settings feature. The default setting of the tags can be organized by color. For example, the color of the tag can be determined according to a function of its associated attribute. For example, tags with an associated attribute that has a function relating to viewing documents or media can be red, and tags associated with an attribute that have a function relating to graphing or calculating can be blue. Causing a tag to be first displayed as associated with a VM instance can be in response to receiving a command from a user to modify the VM instance. The modification to the VM instance that can cause a tag to be displayed can be a modification to install an attribute within the VM instance.

Figure 4:
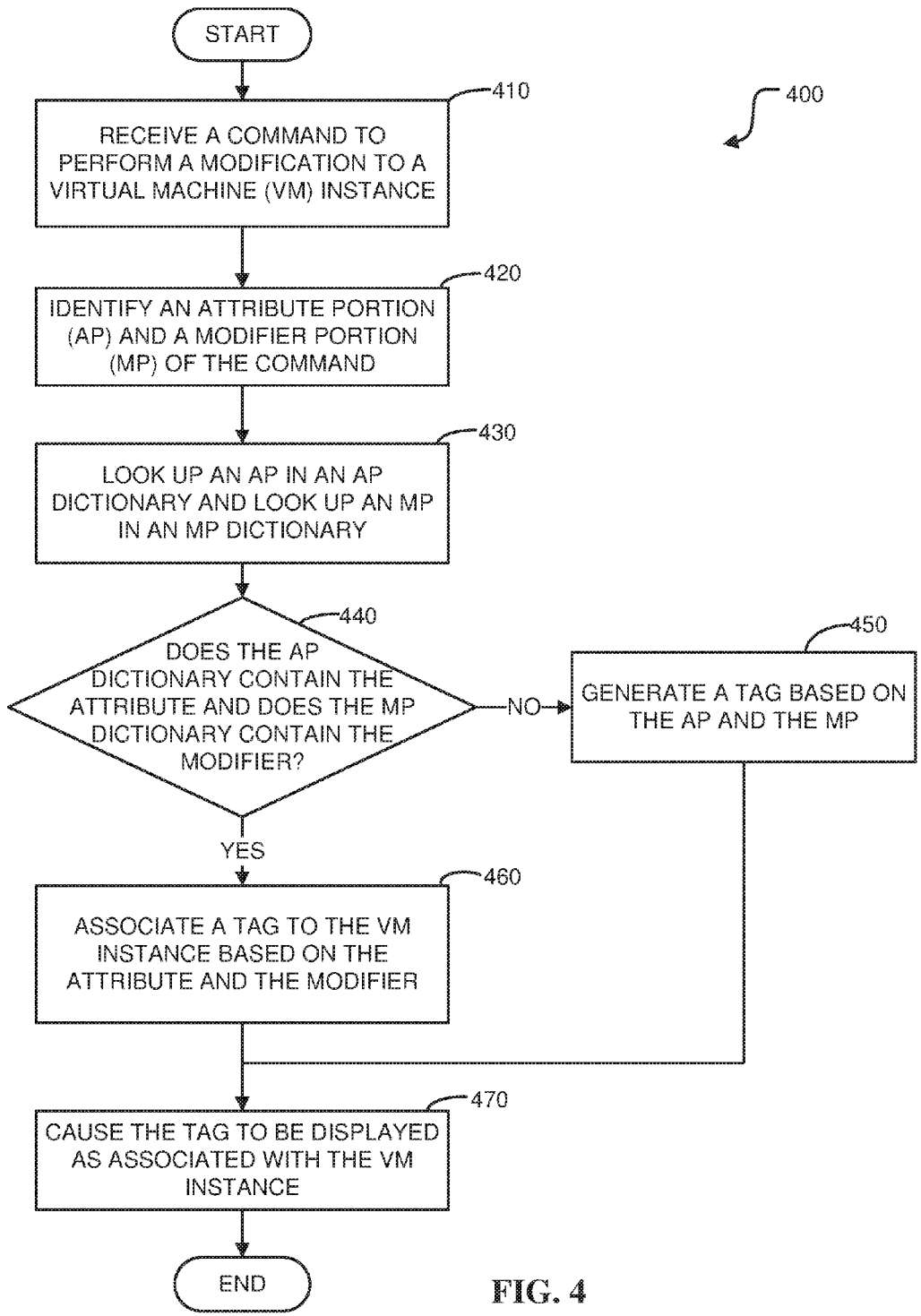
FIG. 4 depicts a method for associating a tag with a VM instance based on an attribute portion of a command and a modifier portion of a command, according to various embodiments.

Turning now to FIG. 4, a method of associating a tag to a VM instance based on a command to modify the VM instance can be seen, according to various embodiments. In embodiments, the method 400 can include, in operation 410, receiving a command to perform a modification to a VM instance. The command is not limited to a particular computer programming language. For example, the command can be C++, Java, Python, and object C. The programming language can depend on the type of computing environment that the VM instance is running in. Modifying the VM instance can include installing software, an application, or a computer program to a base image of the VM instance. Modifying the VM instance can include updating software, an application, or a computer program that is currently installed within the VM instance. Modifying the VM instance can include removing software, an application, or a computer program that has been previously installed within the VM instance. Once operation 410 has received the command, the method can proceed to operation 420.

In embodiments, operation 420 can include identifying an attribute portion (AP) and a modifier portion (MP) of the received command. The received command can include an AP and an MP. The AP of the command can include a portion of the command that is related to the software that is being modified within the VM instance. For example, if the command is a command to install a program called 'package' within the VM instance, e.g., "npm install -g <package>", then "package" is the attribute and "<package>" is the attribute portion of the command. As another example, in the command "apt -g install java", "java" is the attribute portion, as well as the attribute, of the command. The MP of the command can include a portion of the command that is a modifier of the attribute and can indicate how the attribute will be modified. For example, the attribute could be installed, updated, or uninstalled from the VM instance. As another example, the MP of the command "npm install -g<package>" is 'install'.

Identifying the AP and the MP of the command can be accomplished by command line parsing. A command line parser is a software component that takes input data (frequently text) and builds a data structure that gives a structural representation of the input and checks for correct syntax in the process. The command line parser can analyze a string of symbols, e.g., input data that conforms to the rules of the programming language, e.g., C++ or Java. The input data can be text in one or more programming languages, but can also be text in natural language or less structured textual data. A particular class of command line parsing can perform a function using regular expressions (a sequence of characters that define a search pattern), where a regular expression defines a regular language, and then the regular expression engine automatically generates a parser for that language, allowing pattern matching and extraction of text.

Command line parsing can be programmed manually or can be automatically generated by a parser generator. For example, manual parsing can include a user manually starting the parsing process when data text is entered by a user. Manual parsing can be tedious, and a user can forget to initiate the parsing process. Automatic parsing can be a more convenient method of parsing. Automatic command line parsing does not need manual intervention to initiate the parsing process. Automatic command line parsing can include a parsing generator parsing all data text entered by a user. Command line parsing is used in the analysis of computer languages, and may involve the syntactic analysis of the input code into its component parts, e.g., the AP and the MP. Command line parsing can identify portions of the command according to syntax of the command. For example, by command line parsing the command "npm install -g <package>" according to the syntax of the command, the attribute 'package' can be identified. More specifically, a computer system could parse the command by looking for the symbols "<" or ">" within the command, then extract the word within the symbols. Once the AP and the MP of the command have been identified, the method 400 can proceed to operation 430.

In embodiments, operation 430 can include looking up the identified AP in an AP dictionary and the identified MP in an MP dictionary. The AP dictionary can include a plurality of known APs. Multiple known APs can correspond to a single attribute (for example, where two or more APs are equivalents in different programming languages). A known AP from the AP dictionary can be an AP of a particular programming language that corresponds to the attribute. An ability to use a plurality of known APs can be a way for automatic command line parsing to be compatible with a plurality of programming languages. For example, the plurality of known APs can include a known AP from the programming language C++, and the plurality of known APs can include an equivalent known AP from the programming language java. For example, by looking up the identified AP "<package>" in the AP dictionary, operation 430 can find the known AP corresponding to the attribute "package" and then match the identified AP with the attribute "package". Similarly, by looking up an identified AP "java" in the AP dictionary, operation 430 can match the identified AP with the attribute "java".

Similarly, the MP dictionary can include a plurality of known MPs from various programming languages and the plurality of known MP's associated modifiers. For example, by looking up the identified MP "inst" indicating a modifier to install the attribute, 'package', in the MP dictionary, operation 430 can locate the corresponding known MP then match "inst" with the modifier "install". Similarly, by looking up the identified MP "-get install" in the MP dictionary, operation 430 can match "-get install" with the associated modifier "install".

Though looking up an AP in the AP dictionary can be substantially similar to looking up an MP in the MP dictionary, looking up the AP and the MP can be for different purposes. Looking up the AP can be for displaying, more clearly, to the developer or his organization, the attribute as a tag as associated with the VM instance. Looking up the MP can be to determine whether to generate a tag, or modify, e.g. remove or replace, an existing tag. By looking up the AP and the MP in their corresponding dictionaries, this might increase the likelihood of more accurately associating a tag with a VM instance.

In embodiments, employing operation 430 may not occur. In some embodiments, command line parsing can identify the attribute of the AP and the modifier of the MP without looking up the AP and the MP in their corresponding dictionaries. In some embodiments, command line parsing can identify the attribute of the command but not the modifier of the command, and in some cases it cannot identify the attribute of the command but it can identify the modifier of the command. In some embodiments, if command line parsing cannot identify the attribute or the modifier, operation 430 can be employed. Once operation 430 has completed looking up the AP in the AP dictionary and the MP in the MP dictionary, operation 430 can proceed to a decision block 440.

In embodiments, decision block 440 can include determining that the attribute was found in the AP dictionary and that the modifier was found in the MP dictionary. In embodiments, employing decision block 440 may not be necessary if command line parsing can successfully identify the attribute of the command and the modifier of the command. In embodiments, once the attribute and the modifier can be successfully found in their corresponding dictionaries, decision block 440 can proceed to an operation 460; otherwise, if the attribute or the modifier cannot be found, decision block 440 can proceed to an operation 450.

In embodiments, operation 450 can include associating a tag to the VM instance based on the AP and the MP of the command. This associated tag can include the AP as parsed from the command. For example, the generated tag can include "<package>" from the command "npm install -g<package>", rather than "package". Similarly, this associated tag can depend on the MP of the command. For example, the MP can be a modifier that is to install the attribute. In some embodiments, the MP can be a modifier to update or uninstall the attribute. Updating and uninstalling the attribute of the command is discussed further in FIG. 5. An alternative to associating the tag with the VM instance based on the AP or MP can be to associate a tag more directly based on the attribute and the modifier. In embodiments, once the tag has been associated with the VM instance based on the AP and the MP, operation 450 can proceed to operation 470.

In embodiments, operation 460 can include associating the tag to the VM instance based on the attribute and the modifier. This associated tag can be a result of successfully parsing the attribute and the modifier from the command. For example, the tag associated with the VM instance can include the word "install" to indicate the action taken within the VM instance. In embodiments, once the tag has been associated with the VM instance based on the attribute and modifier, operation 460 can proceed to operation 470.

In embodiments, operation 470 can include causing the tag to be displayed as associated with the VM instance. In embodiments, causing the tag to be displayed as associated with the VM instance can include, e.g., displaying the tag within a user interface (UI). In embodiments, the tag can be added to an existing UI, or the UI can be created in response to the generated tag. The tag can be displayed along with one or more other tags associated with the VM instance within the UI. Causing the tag to be displayed can include notifying the user that the tag has been associated to the VM instance in the form of a brief message shown on the end user's computing device, e.g. a mobile phone, a desktop computer, or a laptop. The user can also be prompted via a message or request for permission to associate the tag with the VM instance. The user can accept the tag as associated with the VM instance. In embodiments, prompting can occur in operation 450 or in operation 460.

In some embodiments, the one or more other tags associated with the VM instance can be modified, e.g., in response to a command to modify, such as to update or remove, the attribute associated with the tags. For example, if a tag associated with a VM instance exists as a result from a prior received command to install or update an attribute, then the existing tag can be removed from the UI if the modifier is to uninstall, or the existing tag can be replaced with a new tag based on the AP and the MP of the recent command.

Figure 5:
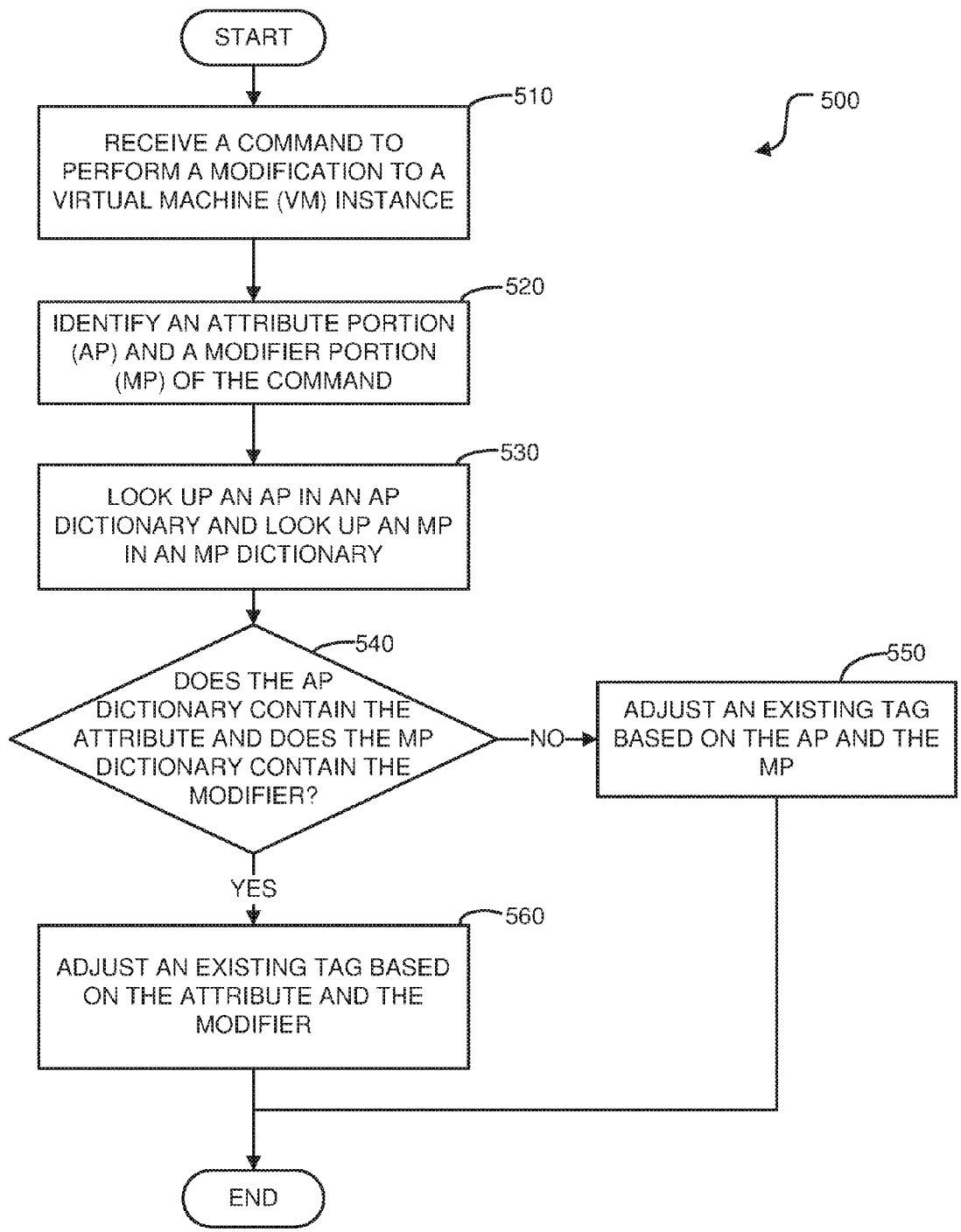
FIG. 5 depicts a method for adjusting an existing tag associated with a VM instance based on a command, according to various embodiments.

Turning now to FIG. 5, a method 500 of adjusting an existing tag associated with a VM instance based on a command to modify an attribute that is currently installed within the VM instance can be seen, according to various embodiments. In embodiments, the method 500 can include, in operation 510, receiving a command to perform a modification to an attribute that is currently installed in a VM instance. The modification to the attribute can include uninstalling the attribute, and the modification can include upgrading the attribute. For example, the command can be a modification to uninstall or remove tag A 320, tag B 330, or tag C 340 within the UI 300 in FIG. 3. In embodiments, once the command to modify an existing attribute has been received, operation 510 can proceed to operation 520.

In embodiments, operation 520 can include identifying an attribute portion (AP) and a modifier portion (MP) of the command in a substantially similar way as in operation 420. The AP and the MP can be determined by command line parsing. In embodiments, after the AP and the MP have been identified in operation 520, the method 500 can proceed to operation 530.

In embodiments, operation 530 can include looking up the identified AP in an AP dictionary and the identified MP in an MP dictionary in a substantially similar way as in operation 430. As depicted in this example, the attribute can already be installed within the VM instance. The plurality of known MPs included in the MP dictionary can be modifiers to uninstall, as well as, modifiers to update the currently installed attribute. In embodiments, after looking up the AP in the AP dictionary and looking up the MP in the MP dictionary in operation 530, operation 530 can proceed to decision block 540.

In embodiments, decision block 540 can include can include determining whether the attribute was found in the AP dictionary and whether the modifier was found in the MP dictionary in a substantially similar way as in decision block 440. In embodiments, employing decision block 540 may not be necessary if command line parsing can successfully identify the attribute of the command and the modifier of the command. In embodiments, once the attribute and the modifier can be successfully found in their corresponding dictionaries, decision block 540 can proceed to an operation 560; otherwise, if the attribute or the modifier cannot be found, decision block 540 can proceed to an operation 550.

In embodiments, operation 550 can include adjusting an existing tag based on the AP and the MP. For example, an MP that indicates an action to uninstall an AP that has an existing tag can cause the tag to be removed from the VM instance that the tag is associated with. As another example, an MP that indicated an action to update an AP that has an existing tag can cause the tag to be replaced with the AP or a more accurate representation of the currently installed attribute.

In embodiments, operation 560 can include adjusting an existing tag within the UI 300 based on the modifier and the attribute. The modifier can be an action to uninstall or to update an existing attribute in the VM instance. The associated tag can be removed from the VM instance if the modifier is an action to uninstall, and the associated tag can be replaced with a more accurate tag if the modifier is an action to update. In embodiments, once the existing tag has been adjusted within the VM instance based on the modifier as in operation 560, the method 500 can conclude. In embodiments, once the existing tag has been adjusted within the VM instance based on the MP as in operation 550, the method 500 can conclude.

Some embodiments could rely on the principle that a command that requires that an attribute be used implies certain information about the attribute (e.g., the attribute's existence within the VM instance) that could be relevant for tagging purposes. For example, in some embodiments, a relevant command to be parsed could be a command to run an attribute (e.g., a computer program that is currently installed within the VM instance) that has not yet been tagged. This may occur, for example, in a situation where the embodiments of the present invention were not being used at the time the attribute was installed, and therefore the attribute was not tagged at that time. In the case of such a command to run the attribute, the system could search within the VM instance for the previously installed attribute, and if the attribute is currently installed within the VM instance, a tag could be generated because the currently installed attribute is associated with the VM instance. The system could prompt a user, if the system cannot locate the attribute. The prompt can include a notification that the system cannot locate the attribute. If the system cannot locate the attribute, the prompt can include an option for the user to install the attribute. The user can then enter a command to install the attribute and the attribute can be properly tagged as it is installed.

In other embodiments, the system can include a feature that searches a VM instance for attributes that are currently installed within it. The feature can also include the system searching the computing environment for attributes installed within it, then organizing the attributes according to the VM instances that they are associated with. The system can tag the attributes that are currently installed within each VM instance. The tags can include the names of the attribute associated with the VM instance. The system can also prompt the user to tag each individual attribute when the system identifies an attribute within the VM instance.

An additional example can be included to further explain the embodiments discussed herein. Consider a developer or his organization using a management service in a remote computing environment. The management service can be directed to utilizing a database for storing information for the developer or his organization. The remote computing environment can receive from the user a command to install an application or attribute, such as a pdf viewing application, in a virtual machine (VM) instance. The command can be parsed, and an attribute portion (AP) and a modifier portion (MP) can be identified. A tag can be associated to the VM instance based on the attribute portion and the modifier portion. The user can send another command related to the attribute identified from the command to install the attribute in the VM instance. The other command can include a MP to modify, e.g. uninstall or update, the attribute within the VM instance. The associated tag can be adjusted based on the MP. For example, the tag can be removed if the modifier portion is uninstall, and the tag can be replaced with a new tag if the modifier portion is an update. In embodiments, the appearance of the command can be adjusted by the user. In embodiments, the appearance of the command can also be adjusted based on the usage of the attribute within the VM instance.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
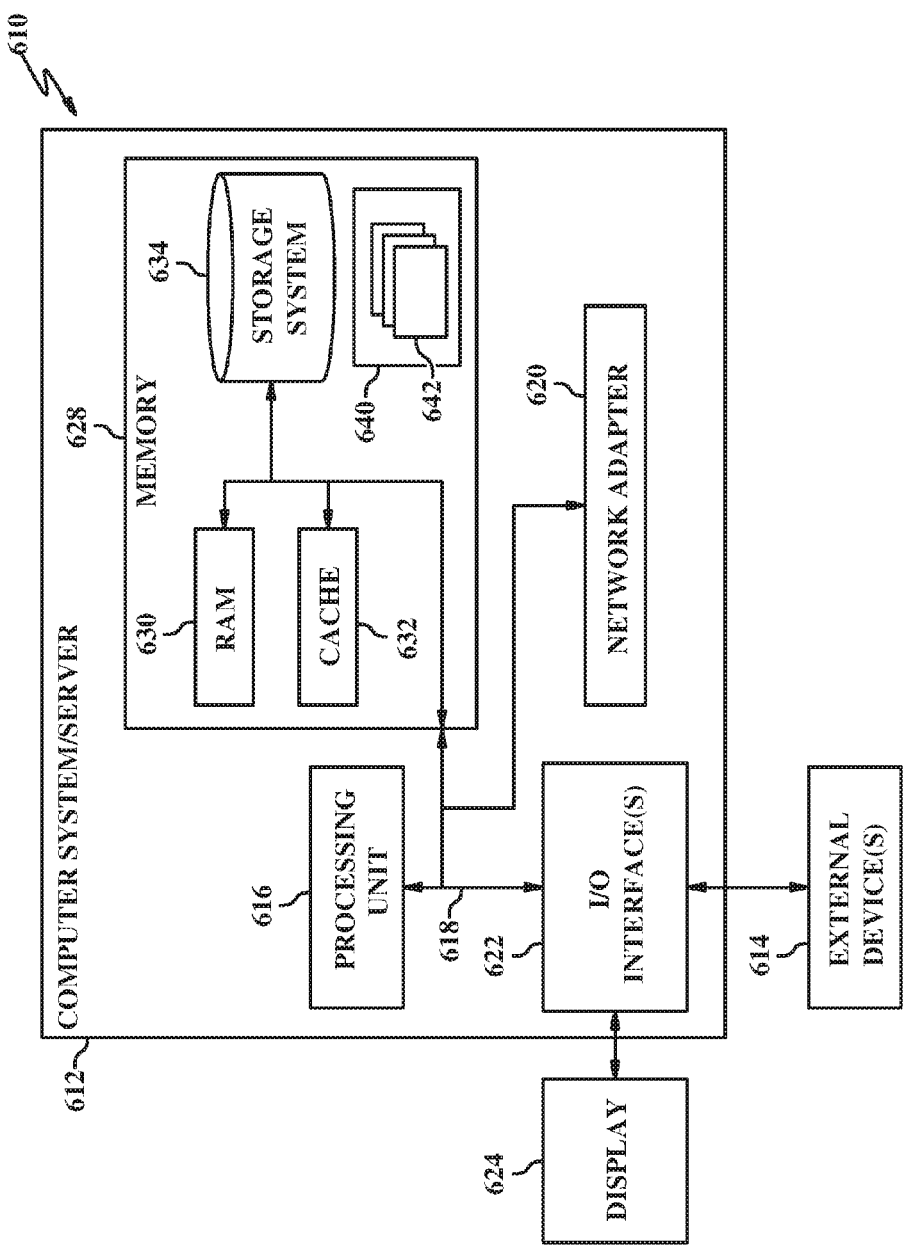
FIG. 6 depicts a cloud computing node according to an embodiment of the present invention.

Referring now to FIG. 6, a schematic of an example of a cloud computing node is shown. Cloud computing node 610 is only one example of a suitable cloud computing node and is not intended to suggest any limitation as to the scope of use or functionality of embodiments of the invention described herein. Regardless, cloud computing node 610 is capable of being implemented and/or performing any of the functionality set forth hereinabove.

In cloud computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in cloud computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

Figure 7:
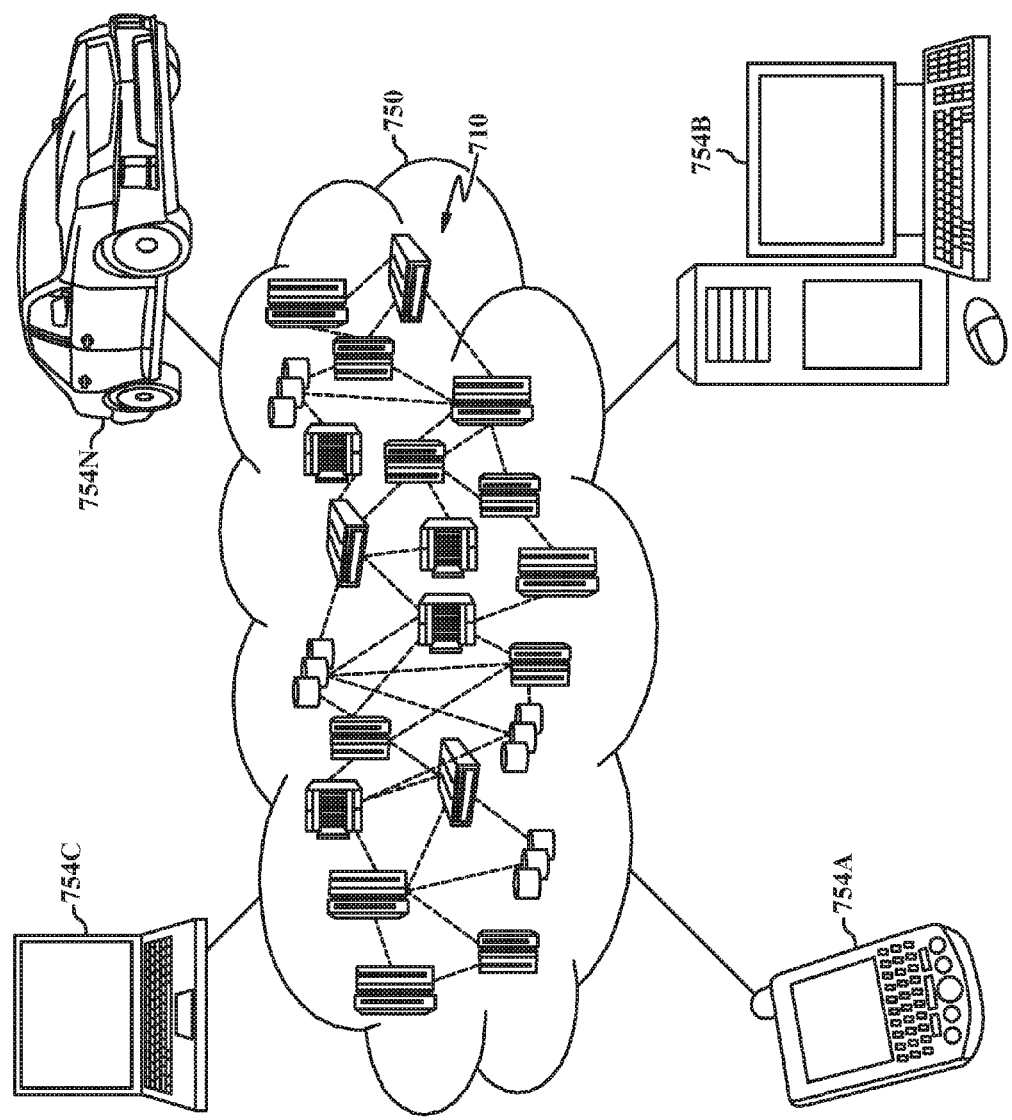
FIG. 7 depicts a cloud computing environment according to an embodiment of the present invention.

Referring now to FIG. 7, illustrative cloud computing environment 750 is depicted. As shown, cloud computing environment 750 comprises one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
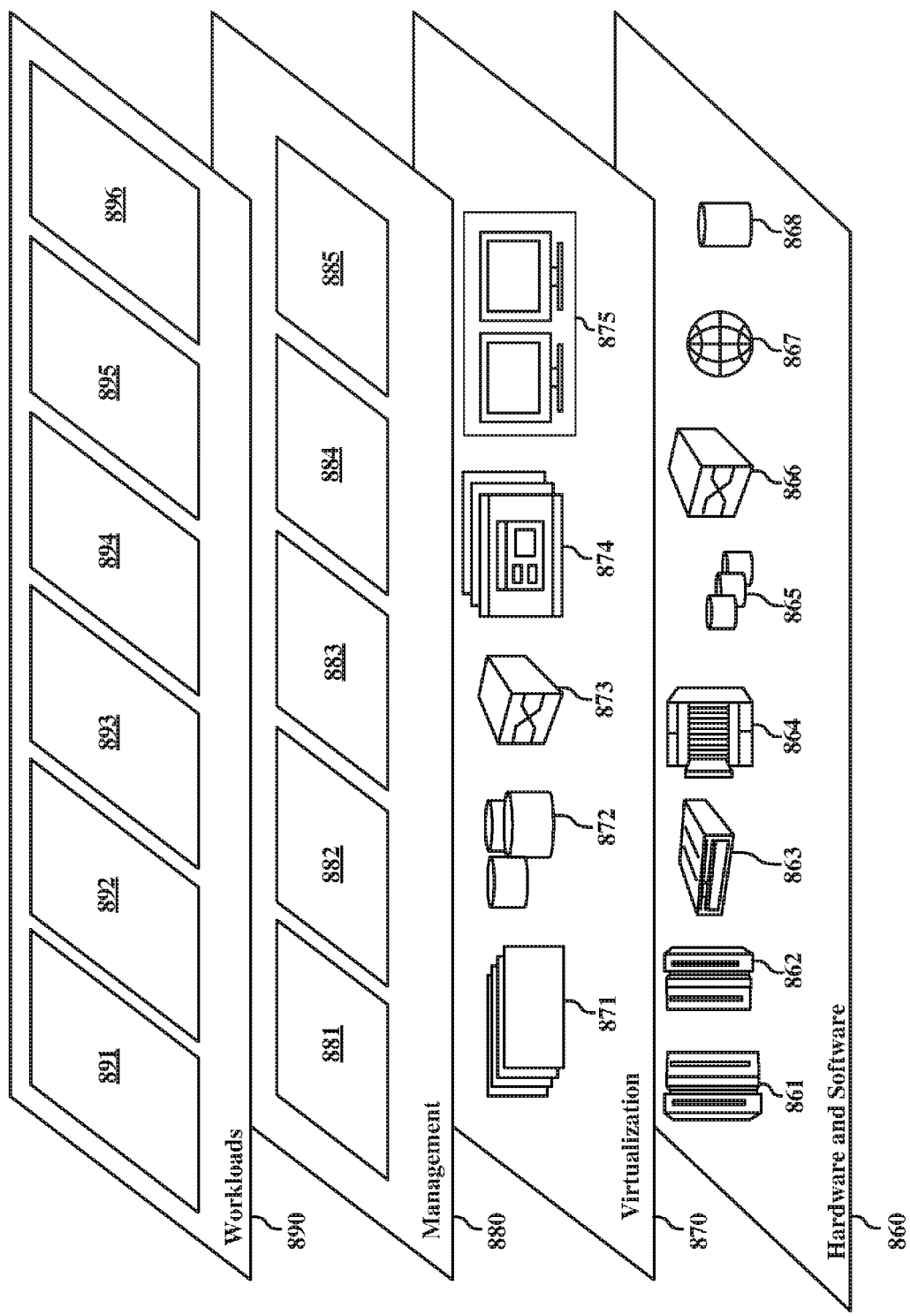
FIG. 8 depicts abstraction model layers according to an embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service level management 884 can include associating a tag based on an attribute portion and a modifier portion of a command. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and mobile desktop 896.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
receiving a first command for a virtual machine (VM) instance;
performing automatic command line parsing on the first command;
associating, based on the automatic command line parsing, a first tag with the VM instance;
identifying, based on automatic command line parsing, an attribute portion (AP) and a modifier portion (MP) of the first command, wherein the associating is based on the AP and the MP;
causing the first tag to be displayed as associated with the VM instance;
receiving a second command to perform a modification to the VM instance;
identifying, based on automatic command line parsing of the second command, the AP and a second MP;
determining that the second MP is a modifier to uninstall an attribute associated with the first tag; and
removing, based on the determining that the second MP is a modifier to uninstall the attribute associated with the first tag, the first tag.

2. The method of claim 1, wherein the first command is a command to run a previously installed attribute, wherein the first tag indicates that the previously installed attribute is installed.

3. The method of claim 1, the method further comprising: prompting, in response to the associating the first tag based on the AP and the MP, a user to accept the first tag.

4. The method of claim 1, wherein the causing the first tag to be displayed is provided as a service in a distributed computing environment.

5. The method of claim 1, the method further comprising providing an option for a user to customize an appearance of the first tag.

6. The method of claim 1, the method further comprising adjusting an appearance of the first tag based on usage of an attribute corresponding to the AP.

7. The method of claim 1, the method further comprising displaying the VM instance based on searching one or more tags within the display, wherein the one or more tags searched are associated with the VM instance based on the AP.

8. A system comprising:
a processor; and
a computer-readable storage medium having program instructions embodied therewith, the program instructions executable by the processor to cause the system to:
receive a first command for a virtual machine (VM) instance;
perform automatic command line parsing on the first command;
associate, based on the automatic command line parsing, a first tag with the VM instance;
identify, based on automatic command line parsing, an attribute portion (AP) and a modifier portion (MP) of the first command, wherein the associating is based on the AP and the MP;
cause the first tag to be displayed as associated with the VM instance;
receive a second command to perform a modification to the VM instance;
identify, based on automatic command line parsing of the second command, the AP and a second MP;
determine that the second MP is a modifier to uninstall an attribute associated with the first tag; and
remove, based on the determining that the second MP is a modifier to uninstall the attribute associated with the first tag, the first tag.

9. The system of claim 8, wherein the first command is a command to run a previously installed attribute, wherein the first tag indicates that the previously installed attribute is installed.

10. The system of claim 8, wherein the program instructions are further executable by the processor to cause the system to:
prompt, in response to associating a tag based on the AP and the MP, a user to accept the first tag.

11. The system of claim 8, wherein the causing the first tag to be displayed is provided as a service in a distributed computing environment.

12. The system of claim 8, the system further comprising providing an option for a user to customize an appearance of the first tag.

13. The system of claim 8, the system further comprising adjusting an appearance of the first tag based on usage of an attribute corresponding to the AP.

14. The system of claim 8, the system further comprising displaying the VM instance based on searching one or more tags within the display, wherein the one or more tags searched are associated with the VM instance based on the AP.

15. A computer program product comprising a computer-readable storage medium having program instructions embodied therewith, wherein the computer-readable storage medium is not a transitory signal per se, the program instructions executable by a computer to perform a method comprising:
receiving a first command for a virtual machine (VM) instance;
performing automatic command line parsing on the first command;
associating, based on the automatic command line parsing, a first tag with the VM instance;
identifying, based on automatic command line parsing, an attribute portion (AP) and a modifier portion (MP) of the first command, wherein the associating is based on the AP and the MP;
causing the first tag to be displayed as associated with the VM instance;
receiving a second command to perform a modification to the VM instance;
identifying, based on automatic command line parsing of the second command, the AP and a second MP;
determining that the second MP is a modifier to uninstall an attribute associated with the first tag; and
removing, based on the determining that the second MP is a modifier to uninstall the attribute associated with the first tag, the first tag.

16. The computer program product of claim 15, wherein the causing the first tag to be displayed is provided as a service in a distributed computing environment.

17. The computer program product of claim 15, the computer program product further comprising providing an option for a user to customize an appearance of the first tag.

18. The computer program product of claim 15, the computer program product further comprising adjusting an appearance of the first tag based on usage of an attribute corresponding to the AP.

19. The computer program product of claim 15, the computer program product further comprising displaying the VM instance based on searching one or more tags within the display, wherein the one or more tags searched are associated with the VM instance based on the AP.

* * * * *